United States Patent
Komatsu et al.

(10) Patent No.: US 12,545,837 B2
(45) Date of Patent: Feb. 10, 2026

(54) PHOSPHOR, LIGHT SOURCE USING SAME, BIOCHEMICAL ANALYSIS DEVICE, AND METHOD FOR PRODUCING PHOSPHOR

(71) Applicant: HITACHI HIGH-TECH CORPORATION, Tokyo (JP)

(72) Inventors: Masaaki Komatsu, Tokyo (JP); Shin Imamura, Tokyo (JP); Yoshifumi Sekiguchi, Tokyo (JP); Takahiro Ando, Tokyo (JP); Eiichiro Takada, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 509 days.

(21) Appl. No.: 18/030,784

(22) PCT Filed: Aug. 31, 2021

(86) PCT No.: PCT/JP2021/031971
§ 371 (c)(1),
(2) Date: Apr. 7, 2023

(87) PCT Pub. No.: WO2022/091568
PCT Pub. Date: May 5, 2022

(65) Prior Publication Data
US 2023/0374377 A1    Nov. 23, 2023

(30) Foreign Application Priority Data
Oct. 28, 2020    (JP) .................................. 2020-180321

(51) Int. Cl.
C09K 11/68    (2006.01)
C09K 11/77    (2006.01)
(Continued)

(52) U.S. Cl.
CPC ........ C09K 11/681 (2013.01); C09K 11/7708 (2013.01); H10H 20/8512 (2025.01); H10H 20/0361 (2025.01)

(58) Field of Classification Search
CPC .............. C09K 11/681; C09K 11/7708; H10H 20/8512; H10H 20/0361
(Continued)

(56) References Cited

U.S. PATENT DOCUMENTS
2018/0358514 A1    12/2018    Tragl et al.

FOREIGN PATENT DOCUMENTS
CN    1544578 A    11/2004
CN    106281324 A    1/2017
(Continued)

OTHER PUBLICATIONS

L. N. Bezmaternykh, et al., "Crystal Nucleationof High-Temperature FexGa2-XO3 Multiferroics in Bismuth Trimolybdate-Borate Fluxes", ISSN 1063-7745, Crystallography Reports, vol. 53, No. 7, 2008, pp. 1232-1235.
(Continued)

*Primary Examiner* — Anita Nassiri-Motlagh
(74) *Attorney, Agent, or Firm* — MATTINGLY & MALUR, PC

(57) ABSTRACT

The purpose of the present invention is to increase the amount of near-infrared light emitted by a phosphor excited by near-ultraviolet light to blue light. The present invention relates to a phosphor containing gallium oxide $Ga_2O_3$ as the base composition, one or two elements selected from Cr and Fe as the light-emitting center, and aluminum fluoride $AlF_3$ as the flux.

10 Claims, 6 Drawing Sheets

(51) Int. Cl.
*H10H 20/01* (2025.01)
*H10H 20/851* (2025.01)

(58) Field of Classification Search
USPC .................................................. 252/301.4 F
See application file for complete search history.

(56) References Cited

FOREIGN PATENT DOCUMENTS

| | | | |
|---|---|---|---|
| JP | H11-508628 | A | 7/1999 |
| JP | 2004526330 | A | 8/2004 |
| JP | 2008004653 | A | 1/2008 |
| JP | 2018518046 | A | 7/2018 |
| WO | 97/02721 | A1 | 1/1997 |
| WO | 02/091530 | A1 | 11/2002 |

OTHER PUBLICATIONS

International Search Report of PCT/JP2021/031971 dated Oct. 26, 2021.
Extended European Search Report received in corresponding European Application No. 21885687.0 dated Aug. 2, 2024.

PHOSPHOR, LIGHT SOURCE USING SAME, BIOCHEMICAL ANALYSIS DEVICE, AND METHOD FOR PRODUCING PHOSPHOR

TECHNICAL FIELD

The present invention relates to a phosphor, a light source using the same, a biochemical analysis device, and a method for producing a phosphor.

BACKGROUND ART

Light emitting diodes (LEDs) are used as light sources, and blue light emitting LEDs are mainly used for illumination and the like. Recently, a light source has been developed that includes an LED that emits near-ultraviolet light to blue light (near-ultraviolet light emitting LED) and a phosphor that is excited by the LED and emits visible light to infrared light.

For example, JPH11-508628A (PTL 1) discloses a phosphor having the formula $Ga_2O_3$:n % RE (in which RE is a rare earth dopant selected from the group consisting of Eu and Dy, n % is the mole percent of RE present in $Ga_2O_3$, and the rare earth is in a range to be soluble in $Ga_2O_3$), in which the phosphor is characterized by exhibiting electroluminescence when an effective voltage is applied to the phosphor.

JP2004-526330A (PTL 2) discloses, in a broadband light source containing at least one medium containing one or more transition metal ion species or rare earth metal ion species, a light source characterized by producing a broad output spectrum having a bandwidth of at least about 150-250 nm in the near-infrared region when light energy is injected.

CITATION LIST

Patent Literature

PTL 1: JPH11-508628A
PTL 2: JP2004-526330A

SUMMARY OF INVENTION

Technical Problem

In the related art, in analysis using biochemical analysis devices, tungsten lamps have been used as light sources that emit light over a wide range of 340 nm to 800 nm. However, the tungsten lamp has a short lamp life of about three months and requires frequent maintenance.

Therefore, attempts have been made to use a combination of a near-ultraviolet light emitting LED and a phosphor as a light source for a biochemical analysis device. However, when a near-ultraviolet light emitting LED and a phosphor are used in combination as a light source for a biochemical analysis device, in order to cover the emission range from 340 nm to 800 nm, it was necessary to use a phosphor that emits near-infrared light by exciting the phosphor with near-ultraviolet light to blue light. When a near-ultraviolet light emitting LED and a phosphor are used in combination as a light source, there is a problem that the near-infrared luminous intensity (luminescence amount) normally emitted by the phosphor is low.

The present invention has been made in view of the above problems and an object of the present invention is to increase the amount of near-infrared light emitted by a phosphor excited by near-ultraviolet light to blue light. Another object of the present invention is to provide a biochemical analysis device that can be easily maintained by using a near-ultraviolet light emitting LED and the phosphor in combination as a light source for the biochemical analysis device.

Solution to Problem

As a result of intensive research, the present inventors have found that the above problems can be solved by the particulate phosphor prepared by adding chromium Cr and/or iron Fe as a luminescent center to gallium oxide $Ga_2O_3$ as a matrix composition, and using aluminum fluoride $AlF_3$ as a flux, and completed the present invention.

That is, the phosphor according to the present invention is characterized by containing gallium oxide $Ga_2O_3$ as a matrix composition, one or two elements selected from Cr and Fe as a luminescent center, and aluminum fluoride $AlF_3$ as a flux.

The present specification includes the disclosure content of Japanese Patent Application No. 2020-180321, which is the basis of priority of the present application.

Advantageous Effects of Invention

The present invention provides a phosphor that emits an increased amount of near-infrared light when excited by near-ultraviolet light to blue light. As a result, the near-ultraviolet light emitting LED and the phosphor can be used as a light source of a biochemical analysis device, and a biochemical analysis device with easy maintenance can be provided. Problems, configurations, and effects other than those described above will be clarified by the following description of the embodiments.

DESCRIPTION OF EMBODIMENTS

Figure 1:
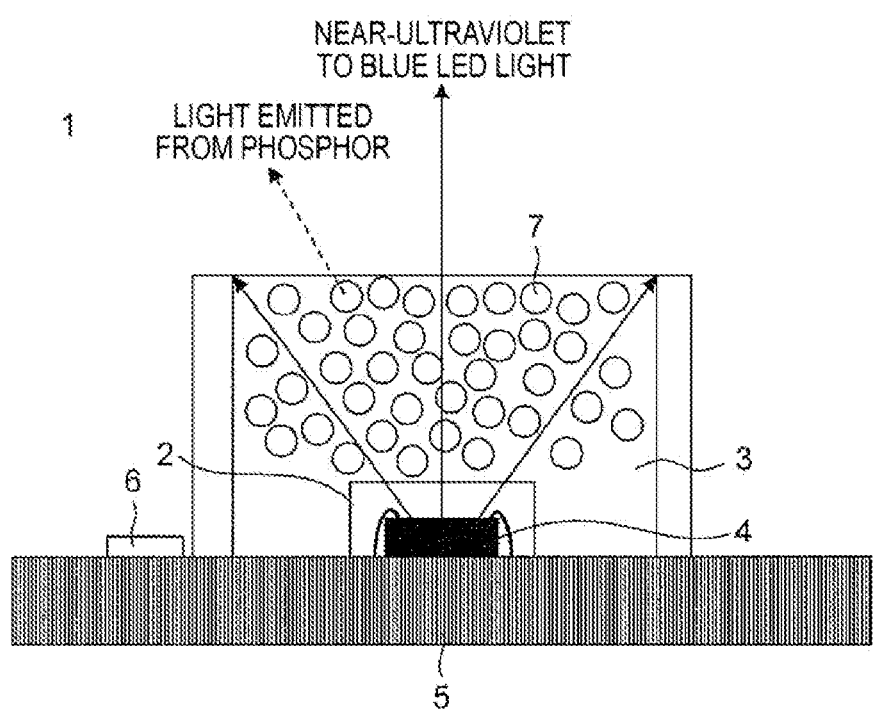
FIG. 1 is a schematic diagram of a light source used in a biochemical analysis device of the present invention.

An embodiment of the present invention will be described below with reference to the drawings and the like. In the drawings, the dimension and shape of each part are exaggerated for clarity, and the actual dimension and shape are not depicted accurately. Therefore, the technical scope of the present invention is not limited to the dimensions and shapes of the parts shown in these drawings. The following description shows specific examples of the contents of the present invention, and the present invention is not limited to the descriptions, and various changes and modifications can be made by those skilled in the art within the scope of the technical ideas disclosed in the present specification. In the drawings for describing the present invention, parts having the same functions are given the same reference numerals, and repeated descriptions thereof may be omitted.

In the present specification, "–" is used to mean having the lower limit value and upper limit value of the numerical values before and after it. When the upper limit value or lower limit value is 0, the upper limit value or lower limit value is not included. In the numerical ranges described stepwise in the present specification, the upper limit value or lower limit value described in one numerical range may be replaced with the upper limit value or lower limit value described in other steps. The upper limit value or lower limit value of the numerical ranges described in the present specification may be replaced with the values shown in Examples.

<Phosphor>

The present invention relates to a phosphor containing gallium oxide $Ga_2O_3$ as a matrix composition, one or two elements selected from Cr and Fe as a luminescent center, and aluminum fluoride $AlF_3$ as a flux.

Here, when the element as the luminescent center is Cr, the concentration of Cr is usually 0.5 mol % to 4.0 mol %, preferably 1.0 mol % to 2.5 mol %, more preferably 1.2 mol % to 1.8 mol %, with respect to the molar amount of Ga.

When the element as the luminescent center is Fe, the concentration of Fe is usually 0.5 mol % to 4.0 mol %, preferably 1.0 mol % to 2.5 mol %, more preferably 1.2 mol % to 1.8 mol %, with respect to the molar amount of Ga.

When the elements as luminescent centers are Cr and Fe, the total concentration of Cr and Fe is usually 0.5 mol % to 8.0 mol %, preferably 1.0 mol % to 5.0 mol %, more preferably 1.2 mol % to 3.6 mol %, with respect to the molar amount of Ga.

Elements serving as luminescent centers are diffused in gallium oxide $Ga_2O_3$ serving as the matrix composition. By containing Cr and/or Fe as an element as a luminescent center and further by setting the concentration of the element as a luminescent center within the above range, the luminescence amount of near-infrared light, for example, the light of 800 nm, emitted by the phosphor of the present invention when excited by near-ultraviolet light to blue light is increased.

The Al concentration of aluminum fluoride $AlF_3$ as a flux is usually 1 mol % to 60 mol %, preferably 5 mol % to 40 mol %, more preferably 10 mol % to 20 mol %, with respect to the molar amount of Ga.

Aluminum fluoride $AlF_3$ as a flux is coated on particles of gallium oxide $Ga_2O_3$ containing elements as luminescent centers. By using aluminum fluoride $AlF_3$ as a flux and adjusting the concentration within the above range, the luminescence amount of near-infrared light emitted by the phosphor of the present invention when excited by near-ultraviolet light to blue light is increased.

The phosphor of the present invention may further contain one or more elements selected from yttrium Y, gadolinium Gd, barium Ba, strontium Sr, and calcium Ca, usually 1 mol % to 80 mol %, preferably 1 mol % to 50 mol %, more preferably 1 mol % to 20 mol %, with respect to the molar amount of Ga. Preferably, the phosphor of the present invention further contains one or more elements selected from Y and Gd, usually 1 mol % to 80 mol %, preferably 1 mol % to 50 mol %, more preferably 1 mol % to 20 mol %, with respect to the molar amount of Ga. Preferably, the phosphor of the present invention further contains at least one element selected from Ba, Sr, and Ca, usually 1 mol % to 80 mol %, preferably 1 mol % to 50 mol %, more preferably 1 mol % to 20 mol %, with respect to the molar amount of Ga.

When the phosphor of the present invention further contains one or more of the above elements in the above amount, the following effects can be obtained. Since the crystal structure changes by including Y, Gd, or Ba, Sr, and Ca, the excitation wavelength and emission wavelength can be adjusted appropriately, and the efficiency of light emission can also be improved.

The phosphor of the present invention usually has an average particle size of 1 μm to 100 μm, preferably 1 μm to 70 μm, more preferably 1 μm to 20 μm. Here, the average particle size can be measured from the median value of particle size distribution measurement using a Coulter meter or the like.

When the phosphor of the present invention has an average particle size within the above range, the phosphor has a large light emitting area and the luminescence amount of near-infrared light emitted by excitation with near-ultraviolet light to blue light is increased.

The phosphor of the present invention absorbs excitation light of usually 200 nm to 600 nm, preferably 300 nm to 500 nm, and emits light of usually 650 nm to 900 nm, preferably 700 nm to 900 nm.

Therefore, when the phosphor of the present invention is irradiated with near-ultraviolet light to blue light as excitation light, the phosphor of the present invention can efficiently emit near-infrared light.

<Method for Producing Phosphor>

The phosphor of the present invention can be produced using a method for producing a phosphor known in the related art, except that gallium oxide $Ga_2O_3$ is used as the matrix composition, one or two elements selected from Cr and Fe are used as the luminescent center, and aluminum fluoride $AlF_3$ is used as the flux.

For example, the phosphor of the present invention can be produced as $Ga_2O_3$:Cr, $Ga_2O_3$:Fe, or $Ga_2O_3$:Cr, Fe phosphors by mixing gallium oxide $Ga_2O_3$ as the matrix composition, $Cr_2O_3$ as a raw material of Cr and/or iron chloride (II) $FeCl_2 \cdot 4H_2O_3$ as a raw material of Fe, as the luminescent center, and aluminum fluoride $AlF_3$ as the flux to prepare a phosphor precursor, and baking the phosphor precursor in an air atmosphere at usually 1150° C. to 1250° C., preferably 1180° C. to 1220° C., for example 1200° C., usually for 1 hour to 10 hours, preferably 2 hours to 5 hours.

For example, the phosphor of the present invention can be produced as a $Y_3Ga_5O_{12}$:Cr phosphor by mixing gallium oxide $Ga_2O_3$ as the matrix composition, $Cr_2O_3$ as a raw material of Cr as the luminescent center, aluminum fluoride $AlF_3$ as the flux, and yttrium fluoride $YF_3$ as a raw material of Y as another element to prepare a phosphor precursor, and baking the phosphor precursor in an air atmosphere at usually 1150° C. to 1250° C., preferably 1180° C. to 1220° C., for example 1200° C., usually for 1 hour to 10 hours, preferably 2 hours to 5 hours.

For example, the phosphor of the present invention can be produced as a $Gd_3Ga_5O_{12}$:Cr phosphor by mixing gallium oxide $Ga_2O_3$ as the matrix composition, $Cr_2O_3$ as a raw material of Cr as the luminescent center, aluminum fluoride $AlF_3$ as the flux, and gadolinium chloride $GdCl_3$ as a raw material of Gd as another element to prepare a phosphor precursor, and baking the phosphor precursor in an air atmosphere at usually 1150° C. to 1250° C., preferably 1180° C. to 1220° C., for example 1200° C., usually for 1 hour to 10 hours, preferably 2 hours to 5 hours.

For example, the phosphor of the present invention can be produced as a $BaGa_2O_4$:Fe phosphor by mixing gallium oxide $Ga_2O_3$ as the matrix composition, iron (II) chloride $FeCl_2 \cdot 4H_2O_3$ as a raw material of Fe as the luminescent center, aluminum fluoride $AlF_3$ as the flux, and barium carbonate $BaCO_3$ as a raw material of Ba as another element to prepare a phosphor precursor, and baking the phosphor precursor in an air atmosphere at usually 1150° C. to 1250° C., preferably 1180° C. to 1220° C., for example 1200° C., usually 1 hour to 10 hours, preferably 2 hours to 5 hours.

For example, the phosphor of the present invention can be produced as a $SrGa_2O_4$:Fe phosphor by mixing gallium oxide $Ga_2O_3$ as the matrix composition, iron (II) chloride $FeCl_2 \cdot 4H_2O_3$ as a raw material of Fe as the luminescent center, aluminum fluoride $AlF_3$ as the flux, and strontium carbonate $SrCO_3$ as a raw material of Sr as another element to prepare a phosphor precursor, and baking the phosphor precursor in an air atmosphere at usually 1150° C. to 1250° C., preferably 1180° C. to 1220° C., for example 1200° C., usually 1 hour to 10 hours, preferably 2 hours to 5 hours.

For example, the phosphor of the present invention can be produced as a $CaGa_2O_4$:Fe phosphor by mixing gallium oxide $Ga_2O_3$ as the matrix composition, iron (II) chloride $FeCl_2 \cdot 4H_2O_3$ as a raw material of Fe as the luminescent center, aluminum fluoride $AlF_3$ as the flux, and calcium carbonate $CaCO_3$ as a raw material of Ca as another element to prepare a phosphor precursor, and baking the phosphor precursor in an air atmosphere at usually 1150° C. to 1250° C., preferably 1180° C. to 1220° C., for example 1200° C., usually 1 hour to 10 hours, preferably 2 hours to 5 hours.

For example, the phosphor of the present invention can be produced as a $(Ba,Sr)Ga_2O_4$:Fe phosphor by mixing gallium oxide $Ga_2O_3$ as the matrix composition, iron (II) chloride $FeCl_2 \cdot 4H_2O_3$ as a raw material of Fe as the luminescent center, aluminum fluoride $AlF_3$ as the flux, and barium carbonate $BaCO_3$ and strontium carbonate $SrCO_3$ as raw materials of Ba and Sr as other elements to prepare a phosphor precursor, and baking the phosphor precursor in an air atmosphere at usually 1150° C. to 1250° C., preferably 1180° C. to 1220° C., for example 1200° C., usually 1 hour to 10 hours, preferably 2 hours to 5 hours.

In the method for producing the phosphor of the present invention, by using aluminum fluoride $AlF_3$ as the flux, aluminum fluoride $AlF_3$ as the flux can sufficiently melt the phosphor raw material within the above temperature range, which is a relatively low temperature without liquifying the raw material. That is, aluminum fluoride $AlF_3$ as the flux can lower the baking temperature of the phosphor precursor to the temperature within the above range and can reduce the environmental load. Aluminum fluoride $AlF_3$ as the flux is coated on particles of gallium oxide $Ga_2O_3$ in which an element is diffused as the luminescent center. The phosphor obtained by baking at a low temperature has a relatively small average particle size, and as a result, the luminescence amount of near-infrared light emitted by excitation with near-ultraviolet light to blue light can be increased.

<Light Source for Biochemical Analysis Device>

FIG. 1 shows the structure of the light source used in the biochemical analysis device of the present invention. A light source 1 is composed of an LED module 2, a transparent resin 3, an LED element 4 as a light emitting element, a heatsink 5, and wiring 6. A plurality of types of phosphors 7 is mixed in the transparent resin 3.

In the light source 1, the LED element 4 is incorporated in the LED module 2, and the LED element 4 is connected to the wiring 6 by the wire. The LED element 4 is adhered to the heatsink 5. The LED module 2 in which the LED element 4 is incorporated is encapsulated in a case by the transparent resin 3 in which a plurality of types of phosphors 7 having emission wavelengths of yellow, green, red, and the like, which use blue light emitted from the LED element 4 as excitation light are encapsulated.

Here, it is preferable to use one LED element as the LED element 4. As the LED element 4, since the luminescence amount (power) of the LED that emits light around 340 nm is smaller than the luminescence amount of the LED that emits blue light, a combination of a plurality, for example, 2, 3, 4 or 5 of LEDs that emit light around 340 nm may also be used to improve the luminescence amount of light around 340 nm. A combination of LED elements having different emission wavelengths, such as a combination of an LED element that emits light of around 340 nm and an LED element that emits light of around 385 nm as the LED element 4 may be incorporated in the LED module 2.

As the phosphor 7, in order to emit light with a wavelength of 340 nm to 800 nm as the wavelength of light emitted from the light source, in addition to the near-infrared light emitting phosphor of the present invention that emits near-infrared light, it is effective to use one or more selected from a blue light emitting phosphor that emits blue light, a green light emitting phosphor that emits green light, a red light emitting phosphor that emits red light, and the like. As the phosphor 7, one or more selected from a near-ultraviolet light emitting phosphor that emits near-ultraviolet light, a phosphor that emits yellow or orange light, a near-infrared light emitting phosphor other than the phosphor of the present invention, and the like may be used.

$Y_2SiO_5$:Ce (P47) phosphor as a near-ultraviolet light emitting phosphor, and $BaMgAl_{10}O_{17}$:Eu (BAM) phosphor (340 nm excitation) or $(Sr,Ca,Ba)_{10}(PO_4)_6Cl_2$:Eu (SCA) phosphor (385 nm excitation) as a blue light emitting phosphor, $(Sr,Ba,Mg)_2SiO_4$:Eu (BOS) phosphor as a green light emitting phosphor, and $CaAlSiN_3$:Eu (CASN) phosphor as a red light emitting phosphor can be used.

Examples of phosphors that emit blue light when excited by near-ultraviolet light include $Sr_5(PO_4)_3Cl$:Eu, $Ba_5SiO_4Cl_6$:Eu, $(Sr, Ba) Al_2Si_2O_8$:Eu, $BaMg_2Al_{16}O_{27}$:Eu, $Sr_4Al_{14}O_{25}$:Eu, $Sr_2P_2O_7$:Eu, $Sr_3(PO_4)_2$:Eu, $LiSrPO_4$:Eu, $Ba_3MgSi_2O_8$:Eu, $BaAl_2S_4$:Eu, $CaF_2$:Eu, AlN:Eu, $BaSi_2O_2N_2$:Eu, $YBO_3$:Ce, $Sr_3(BO_3)_2$:Ce, $LaAl(Si,Al)_6(N,O)_{10}$:Ce, $Y_2O_3$:Bi, GaN:Zn, ZnS:Ag,Cl, ZnS:Ag,Br, and the like.

Examples of phosphors that emit green light when excited by near-ultraviolet light include $Sr_2SiO_4$:Eu, $Ba_2SiO_4$:Eu, $SrAl_2O_4$:Eu, $CaAl_2S_4$:Eu, $SrAl_2S_4$:Eu, $CaGa_2S_4$:Eu, $SrGa_2S_4$:Eu, β-SiAlON:Eu, $CaSi_2O_2N_2$:Eu, $SrSi_2O_2N_2$:Eu, $Ba_3Si_6O_{12}N_2$:Eu, α-SiAlON:Yb, $BaMgAl_{10}O_{17}$:Eu, Mn, $Zn_2GeO_4$:Mn, ZnS:Cu,Al, ZnO:Zn, $LiTbW_2O_8$, $NaTbW_2O_8$, $KTbW_2O_8$, and the like.

Examples of phosphors that emit yellow light and orange light when excited by near-ultraviolet light include $Ca_3SiO_5$:Eu, $Sr_3SiO_5$:Eu, $Ba_3SiO_5$:Eu, $Li_2SrSiO_4$:Eu, $Sr_2Ga_2SiO_7$:Eu, $Sr_3(BO_3)_2$:Eu, α-SiAlON:Eu, $Sr_3SiO_5$:Ce, ZnS:Mn, and the like.

Examples of phosphors that emit red light when excited by near-ultraviolet light include $LiEuW_2O_8$, $NaEuW_2O_8$, $KEuW_2O_8$, $Li_5EuW_4O_{16}$, $Na_5EuW_4O_{16}$, $K_5EuW_4O_{16}$, $Ca_2ZnSi_2O_7$:Eu, SrS:Eu, $Sr_2Si_5N_8$:Eu, $Ba_2Si_5N_8$:Eu, $Sr_2P_2O_7$:Eu, Mn, $Ba_3MgSi_2O_8$:Eu, Mn, $CuAlS_2$:Mn, $Ba_2ZnS_3$:Mn, and the like.

Examples of phosphors that emit near-infrared light when excited by near-ultraviolet to blue light include $Y_3Al_5O_{12}$:Cr, $BaMgAl_{10}O_{17}$:Cr, $Lu_3Ga_5O_{12}$:Cr, $Lu_2Al_5O_{12}$:Cr, $Y_3(Al,Ga)_5O_{12}$:Cr, $Gd_2(Al,Ga)_5O_{12}$:Cr, $Gd_2Sc_2Al_2O_{12}$:Cr, and the like, in addition to the phosphor of the present invention.

In addition to the phosphor of the present invention, by using one or more phosphors selected from the phosphors listed above as the phosphor 7, the wavelength of 340 nm to 800 nm, which is required as the wavelength of the light emitted from the light source, is covered by the near-ultraviolet to blue light emitted from the LED element 4 and the light emitted from the phosphor 7 when excited by the near-ultraviolet to blue light.

The transparent resin 3 is not limited as long as the resin does not absorb the light emitted from the LED element 4 (LED light) and the light emitted from the phosphor 7, and a room temperature curing type, thermosetting, or UV-curable, silicone resins, epoxy resins, fluororesins, or the like, which are known in the related art, can be used.

For example, as the transparent resin 3, when it is a visible light transmissive resin, a silicone resin or the like is mainly used. When it is a near-ultraviolet light transmissive resin, a fluororesin or the like that transmits near-ultraviolet light is used. The transparent resin 3 in which the phosphor 7 is dispersed may be placed directly on the LED element 4, or the resin placed on a base material such as quartz glass that transmits near-ultraviolet light may be installed in the path through which the LED light is emitted. Moreover, the transparent resin 3 can be formed of a single layer, or a plurality of layers such as a two-layer structure in which the type of the mixed phosphor 7 is changed.

The transparent resin 3 in which the phosphor 7 is dispersed can be prepared, for example, as follows. First, the transparent resin 3, the phosphor 7 of the present invention, and other materials are uniformly mixed using a defoaming stirrer to prepare a mixture for preparing the transparent resin 3 film. Subsequently, the prepared mixture is thinly spread over the LED element 4 or the base material using screen printing, a dispenser, a doctor blade, or the like to form a film precursor of the transparent resin 3. The film precursor of the transparent resin 3 is then cured to form the transparent resin 3 in which the phosphor 7 is dispersed. For example, when a room temperature curing resin is used as the transparent resin 3, the film precursor of the transparent resin 3 is cured at room temperature for about 6 hours or more to form the transparent resin 3 in which the phosphor 7 is dispersed. For example, when a thermosetting resin is used as the transparent resin 3, the film precursor of the transparent resin 3 is usually heat-cured usually at 200° C. or less, for example, about 100 to 150° C. for about 1 to 6 hours to form the transparent resin 3 in which the phosphor 7 is dispersed. For example, when a UV curable resin is used as the transparent resin 3, the film precursor of the transparent resin 3 is cured with a high-pressure mercury lamp or the like to form the transparent resin 3 in which the phosphor 7 is dispersed.

The average thickness of the transparent resin 3 in which the phosphor 7 is dispersed is usually 50 μm to 400 μm, preferably 100 μm to 300 μm, more preferably 100 μm to 200 μm.

In the transparent resin in which the phosphor 7 is dispersed, part of the near-ultraviolet to blue LED light from the LED element 4 is converted into visible to near-infrared light by the phosphor 7, and visible to near-infrared light from the phosphor 7 is emitted from the light source 1, together with the near-ultraviolet to blue light from the LED element 4.

Since the surroundings of the LED module 2 and the LED element 4 become hot, the heatsink 5 can be provided. A water-cooled or air-cooled cooling mechanism may be provided on the heatsink 5 side. Since the efficiency of the phosphor 7 emitting light with near-ultraviolet to blue light tends to decrease as the temperature rises, it is preferable to provide a cooling mechanism.

Accordingly, the light source 1 emits white light with emission wavelengths from 340 nm to 800 nm as follows.

When power is supplied to the wiring 6 from the external drive circuit, the LED element 4 lights up and emits blue light. The heatsink 5 has a role of releasing heat generated from the LED element 4 during light emission to the outside, reduces the temperature rise of the LED element 4, and stabilizes the light emission. Part of the blue light emitted from the LED element 4 emits blue light as it is, and the rest of the blue light emission excites the phosphor 7 in the transparent resin 3. The excited phosphor 7 emits light of yellow, green, red, or the like. White light is obtained by mixing the blue light emitted from the LED element 4 and the light in each color emitted from the phosphor 7.

The biochemical analysis device of the present invention includes a light source 1 having such a structure, a sample cell irradiated with light from the light source 1, and a light receiving device for receiving light from the sample cell. By using the light source 1 in the biochemical analysis device, the phosphor 7 is excited by near-ultraviolet to blue LED light, and the LED light and the wavelength-converted light from the phosphor 7 are emitted as light of 340 nm to 800 nm. As the emitted light passes through the sample cell, the light absorption of the sample in the sample cell can be monitored by the light receiving device. The light source 1 has a longer lamp life than a tungsten lamp and is easy to maintain.

EXAMPLES

Hereinafter, the present invention will be described in more detail with reference to examples and comparative examples, but the present invention is not limited to the examples.

In the following examples, first, a near-infrared emitting phosphor was synthesized, the synthesized phosphor was mixed with a transparent resin, the phosphor was dispersed in the transparent resin, and a light source used in a biochemical analysis device was produced.

<Synthesis of Near-Infrared Light Emitting Phosphor>

Comparative Example 1

Synthesis of $BaAl_{12}O_{19}$:Fe 0.38 g of $BaCO_3$, 1.48 g of β-alumina (mixed phase product), 30 mg of $FeCl_2 \cdot 4H_2O$, and 110 mg of $BaCl_2$ as a flux were weighed, mixed, and baked at a temperature of 1450° C. for 2 hours in an air atmosphere.

Example 1

Synthesis of $Ga_2O_3$:Cr 2.24 g of $Ga_2O_3$, 32 mg of $Cr_2O_3$, and 200 mg of $AlF_3$ as a flux were weighed, mixed, and baked at a baking temperature of 1200° C. for 3 hours in an air atmosphere. In the phosphor of Example 1, the Cr concentration was 1.5 mol % with respect to Ga, and the Al concentration was 16 mol % with respect to Ga.

Example 2

Synthesis of $Ga_2O_3$:Cr $Ga_2O_3$:Cr was synthesized in the same manner as in Example 1, except that the baking temperature was changed to 1150° C.

Example 3

Synthesis of $Ga_2O_3$:Cr $Ga_2O_3$:Cr was synthesized in the same manner as in Example 1, except that the baking temperature was changed to 1250° C.

<Emission Spectrum of Near-Infrared Light Emitting Phosphor>

Figure 2:
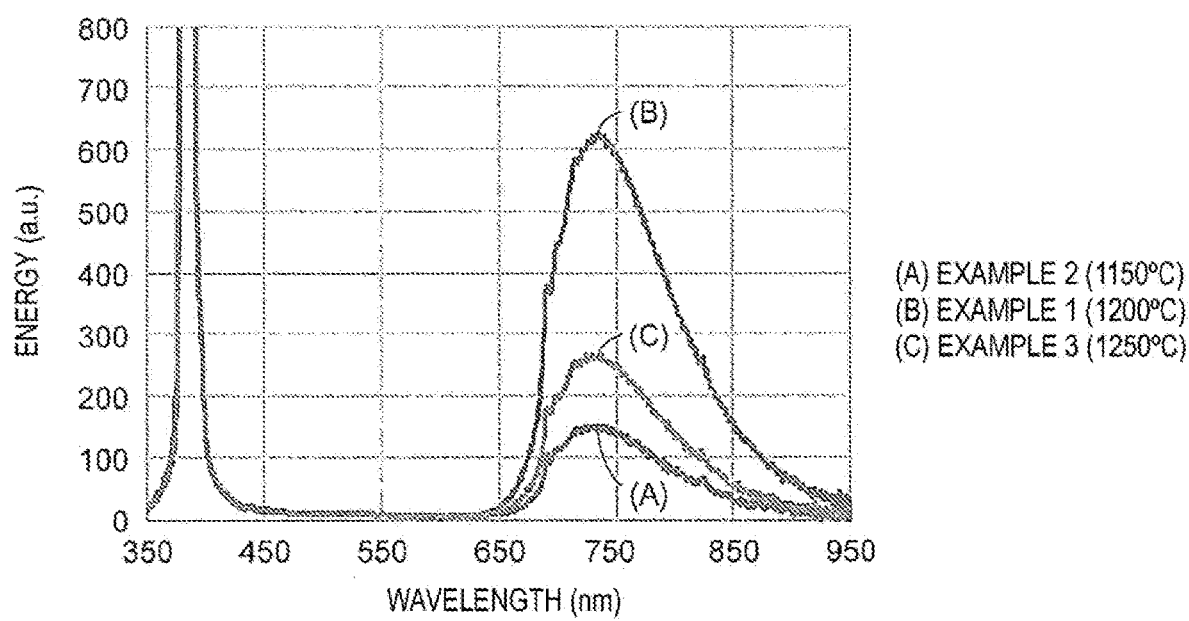
FIG. 2 is a diagram showing light emission spectra of phosphors of Examples 1 to 3.

FIG. 2 shows emission spectra at 385 nm excitation of the phosphors of Example 1 ($Ga_2O_3$:Cr, baking temperature: 1200° C.), Example 2 ($Ga_2O_3$:Cr, baking temperature: 1150° C.), and Example 3 ($Ga_2O_3$:Cr, baking temperature: 1250° C.). As shown in FIG. 2, the emission spectra of the phosphors of Examples 1 to 3 had an emission peak near 730 nm and had a high luminous intensity near 800 nm. The full width at half maximum (FWHM) of the emission spectrum of the phosphors of Examples 1 to 3 was as wide as 120 nm. When $AlF_3$ was used as the flux, the baking temperature was good at 1150° C. to 1250° C., especially 1200° C.

<Excitation Spectrum of Near-Infrared Light Emitting Phosphor>

Figure 3:
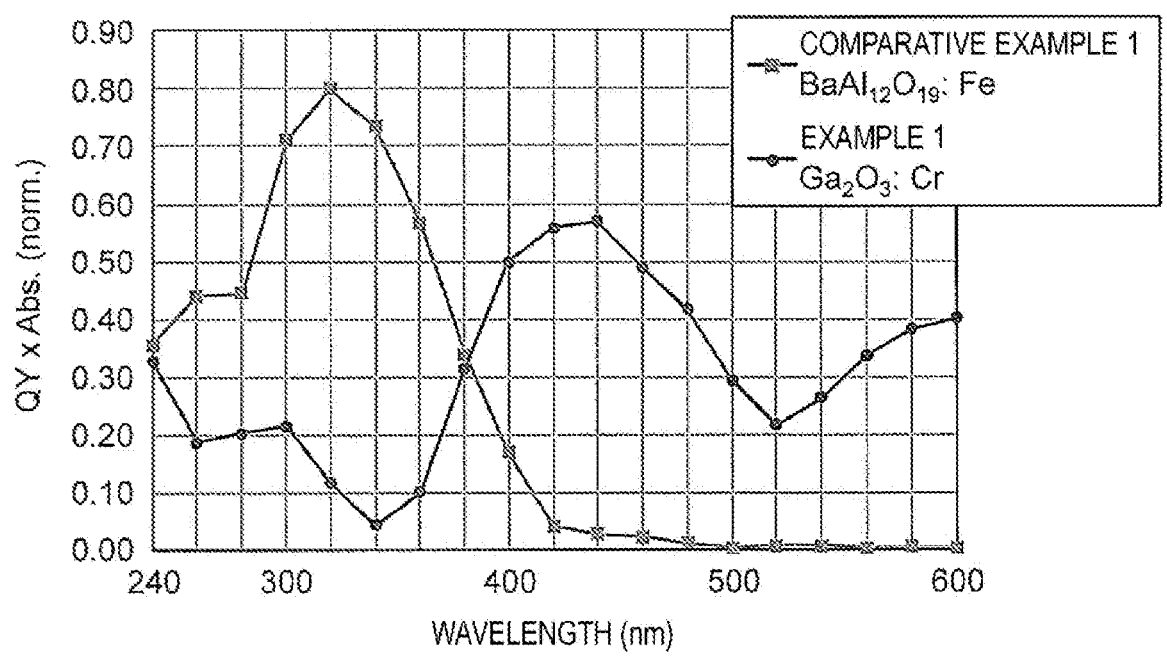
FIG. 3 is a diagram showing excitation spectra of phosphors of Comparative Example 1 and Example 1.

FIG. 3 shows excitation spectra of Comparative Example 1 ($BaAl_{12}O_{19}$:Fe) and Example 1 ($Ga_2O_3$:Cr). From FIG. 3, Example 1 is highly efficient at 385 nm excitation and has an excitation band near 450 nm, and thus, it has been understood that Example 1 is a mixed phosphor film with a blue light emitting phosphor, a green light emitting phosphor, and a red light emitting phosphor, especially a mixed phosphor film with the blue light emitting phosphor, has a large luminescence amount of near-infrared light, and is suitable for forming a single-layer phosphor film.

On the other hand, since Comparative Example 1 does not have an excitation band near 450 nm, a fluorescent film mixed with other phosphors cannot emit near-infrared light, and a single-layer fluorescent film containing Comparative Example 1 reduces the luminescence amount of near-infrared light.

<Emission Spectrum of Fluorescent Film>

Figure 4:
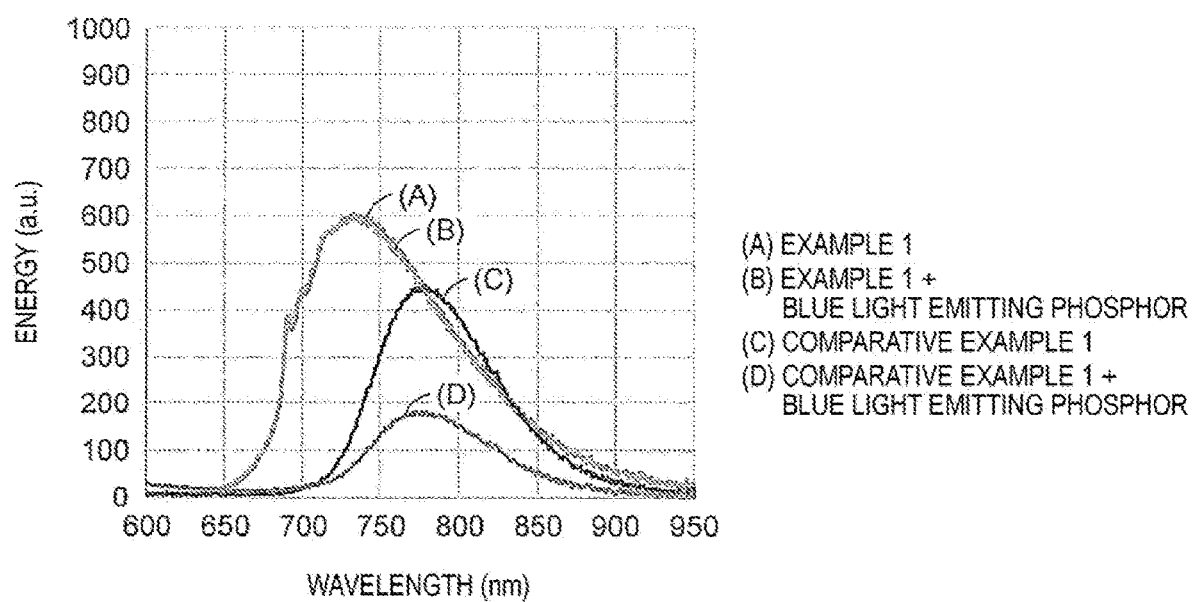
FIG. 4 is a diagram showing light emission spectra of a single-layer fluorescent film produced by mixing the phosphor of Comparative Example 1 or Example 1 and a blue-light emitting phosphor.

FIG. 4 shows the emission spectra at 385 nm excitation of the single-layer fluorescent films produced by mixing the phosphor of Comparative Example 1 or Example 1 and the blue light emitting phosphor. Although the luminescence amount of Comparative Example 1 decreased, the luminescence amount of Example 1 hardly decreased.

<Production of Light Source for Biochemical Analysis Device>

Example 4

The light source 1 shown in FIG. 1 was produced by disposing the transparent resin 3 in which the phosphor 7 was dispersed on the LED element 4 that emits near-ultraviolet light. An LED element emitting light of 385 nm was used as the LED element 4, and a fluororesin was used as the transparent resin 3.

As the phosphor 7, the phosphor of Example 1 was used as a near-infrared light emitting phosphor, and $(Sr,Ca,Ba)_{10}(PO_4)_6Cl_2$:Eu (SCA), $(Sr,Ba,Mg)_2SiO_4$:Eu (BOS), and $CaAlSiN_3$:Eu (CASN) were used as a blue light emitting phosphor, a green light emitting phosphor, and a red light emitting phosphor.

Figure 5:
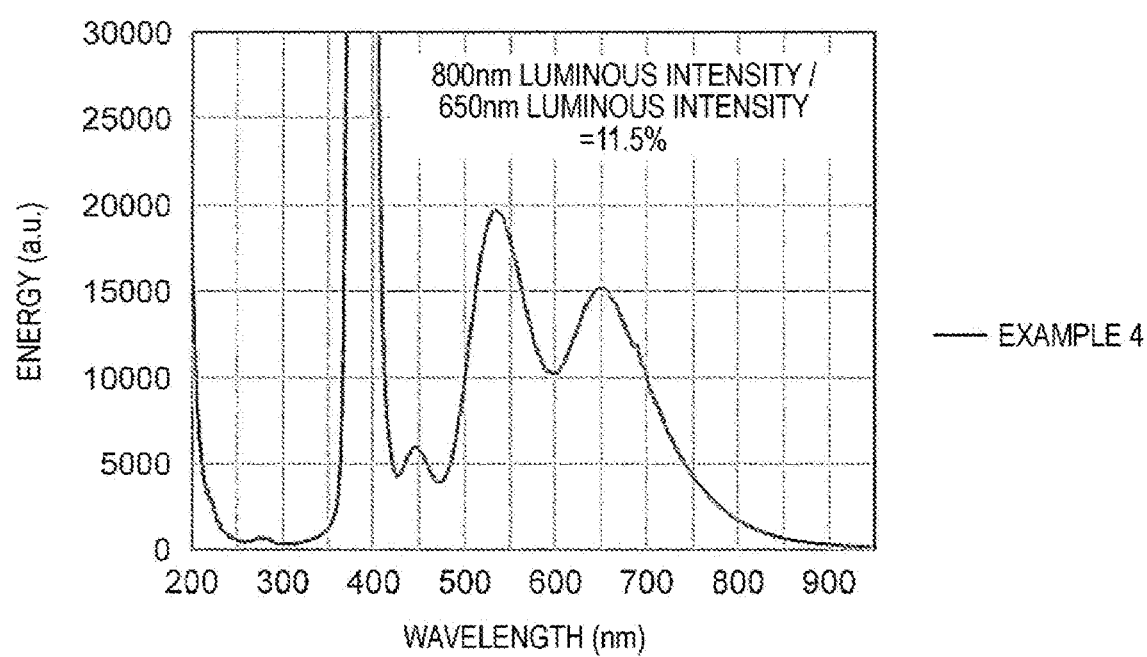
FIG. 5 is a diagram showing the light emission spectrum of a fluorescent film of Example 4.
Figure 6:
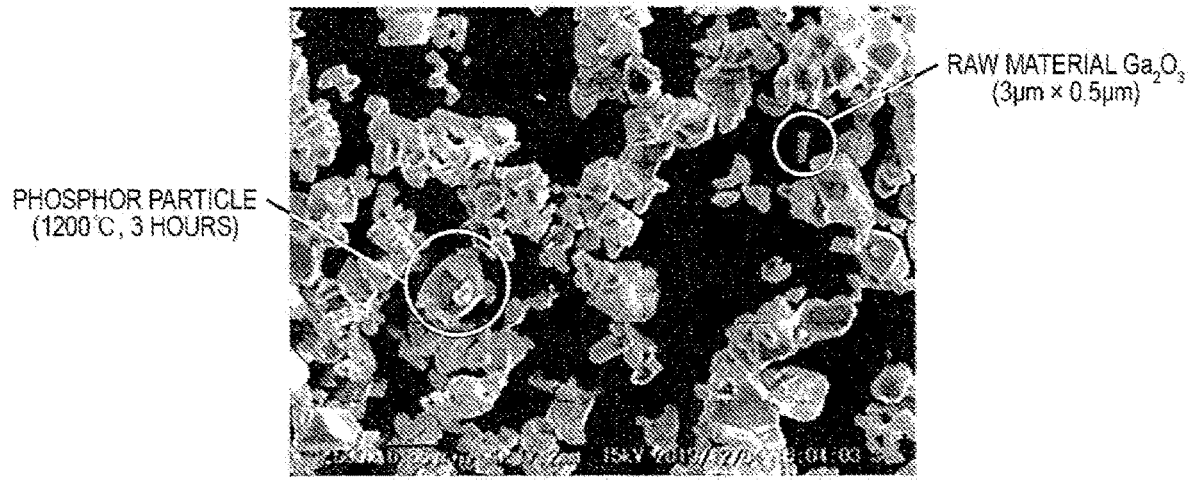
FIG. 6 is an SEM image of Example 1.

The phosphor of Example 1, each of SCA, BOS, and CASN were weighed at 8 mg, added to 320 µl of fluororesin, and mixed. Next, the mixture left for about one day was potted on the quartz glass of the LED module 2 to produce a single layer structure. After potting, the mixture was air-dried to solidify the fluororesin surface and form a fluorescent film. A high-power mini-irradiator was applied to the fluorescent film through quartz glass, and the emitted near-infrared light was confirmed to be around 800 nm. FIG. 5 shows the measured luminescence amount. From FIG. 5, the 800 nm luminous intensity/650 nm luminous intensity was 11.5%, exceeding 10%. FIG. 6 shows an SEM image of Example 1. The phosphor of Example 1 had good crystallinity and a good luminance life span. Therefore, the produced light source 1 was good as a light source for biochemical analysis.

Example 5

The light source 1 shown in FIG. 1 was produced by disposing the transparent resin 3 in which the phosphor 7 was dispersed on the LED element 4 that emits near-ultraviolet light. An LED element emitting light of 385 nm was used as the LED element 4, and a fluororesin was used as the transparent resin 3.

As the phosphor 7, the phosphor of Example 1 was used as a near-infrared light emitting phosphor, and $Y_2SiO_5$:Ce (P47), $BaMgAl_{10}O_{17}$:Eu (BAM), $(Sr,Ba,Mg)_2SiO_4$:Eu (BOS), and $CaAlSiN_3$:Eu (CASN) were used as a near-ultraviolet light emitting phosphor, a blue light emitting phosphor, a green light emitting phosphor, and a red light emitting phosphor.

The phosphor of Example 1 and P47 were each weighed at 8 mg, added to 160 µl of fluororesin, and mixed. Next, the mixture left for about one day was potted on the quartz glass of the LED module 2. The mixture was air-dried for about 30 minutes and then baked at 50° C. for about 30 minutes to solidify the fluororesin surface.

BAM, BOS, and CASN were each weighed at 8 mg, added to 240 µl of fluororesin, and mixed. Next, the mixture left for about one day was further potted on the fluororesin in which the phosphor of Example 1 and P47 were dispersed. The mixture was air-dried for about 30 minutes, then baked at 50° C. for about 30 minutes, and further air-dried for several days to solidify the fluororesin surface, thereby forming a two-layer structure including a layer in which the near-infrared light emitting phosphor and the near-ultraviolet light emitting phosphor were dispersed, and a layer in which the blue light emitting phosphor, the green light emitting phosphor, and the red light emitting phosphor were dispersed. From the emission spectrum of the produced light source 1, it was confirmed that there was near-infrared emission near 800 nm. Therefore, the produced light source 1 was good as a light source for biochemical analysis.

Example 6

The light source 1 shown in FIG. 1 was produced by disposing the transparent resin 3, in which the phosphor 7 was dispersed, on the LED element 4 that emits near-ultraviolet light. Inside the LED module 2, one LED element emitting light of 340 nm and one LED element emitting light of 385 nm, as the LED elements 4, were incorporated. A fluororesin was used as the transparent resin 3.

As the phosphor 7, the phosphor of Example 1 was used as a near-infrared light emitting phosphor, and $(Sr,Ca,Ba)_{10}(PO_4)_6Cl_2$:Eu (SCA), $(Sr,Ba,Mg)_2SiO_4$:Eu (BOS), and $CaAlSiN_3$:Eu (CASN) were used as a blue light emitting phosphor, a green light emitting phosphor, and a red light emitting phosphor.

The phosphor of Example 1 was weighed at 8 mg, added to 80 µl of fluororesin, and mixed. Next, the dispersion left for about one day was potted on the quartz glass of the LED module 2. The dispersion was air-dried for about 30 minutes and then baked at 50° C. for about 30 minutes to solidify the fluororesin surface.

SCA, BOS, and CASN were each weighed at 8 mg, added to 240 µl of fluororesin, and mixed. Next, the mixture left for about one day was further potted on the fluororesin in which the phosphor of Example 1 was dispersed. The mixture was air-dried for about 30 minutes, then baked at 50° C. for about 30 minutes, and further air-dried for several days to solidify the fluororesin surface, thereby forming a two-layer structure including a layer in which the near-infrared light emitting phosphor is dispersed and a layer in which the blue light emitting phosphor, the green light emitting phosphor, and the red light emitting phosphor were dispersed. The light power of the produced light source 1 was improved by adding the LED element emitting 385 nm light to the LED element emitting 340 nm light, and the produced light source was good as a light source for biochemical analysis.

Example 7

The light source 1 shown in FIG. 1 was produced by disposing the transparent resin 3, in which the phosphor 7 was dispersed, on the LED element 4 that emits near-ultraviolet light. Inside the LED module 2, three LED elements emitting 340 nm light were incorporated as the LED elements 4. A fluororesin was used as the transparent resin 3.

As the phosphor 7, $Ga_2O_3$:Cr,Fe phosphor was used as a near-infrared emitting phosphor, and $Y_2SiO_5$:Ce (P47), $BaMgAl_{10}O_{17}$:Eu (BAM), $(Sr,Ba,Mg)_2SiO_4$:Eu (BOS), and $CaAlSiN_3$:Eu (CASN) were used as a near-ultraviolet light emitting phosphor, a blue light emitting phosphor, a green light emitting phosphor, and a red light emitting phosphor.

$Ga_2O_3$:Cr,Fe phosphor and P47 were each weighed at 8 mg, added to 160 µl of fluororesin, and mixed. Next, the mixture left for about one day was potted on the quartz glass of the LED module 2. The mixture was air-dried for about 30 minutes and then baked at 50° C. for about 30 minutes to solidify the fluororesin surface.

BAM, BOS, and CASN were each weighed at 8 mg, added to 240 µl of fluororesin, and mixed. Next, the mixture left for about one day was further potted on the fluororesin in which the $Ga_2O_3$:Cr,Fe phosphor and P47 were dispersed. The mixture was air-dried for about 30 minutes, then baked at 50° C. for about 30 minutes, and further air-dried for several days to solidify the fluororesin surface, thereby forming a two-layer structure including a layer in which the near-infrared light emitting phosphor and the near-ultraviolet light emitting phosphor were dispersed, and a layer in which the blue light emitting phosphor, the green light emitting phosphor, and the red light emitting phosphor were dispersed. The produced light source 1 was good as a light source for biochemical analysis.

Example 8

The light source 1 shown in FIG. 1 was produced by disposing the transparent resin 3, in which the phosphor 7 was dispersed, on the LED element 4 that emits near-ultraviolet light. Inside the LED module 2, one LED element emitting 340 nm light and one LED element emitting 405 nm light, as the LED elements 4, were incorporated. A fluororesin was used as the transparent resin 3.

As the phosphor 7, $Y_3Ga_5O_{12}$:Cr phosphor was used as a near-infrared light emitting phosphor, and $(Sr,Ca,Ba)_{10}(PO_4)_6Cl_2$:Eu (SCA), $(Sr,Ba,Mg)_2SiO_4$:Eu (BOS), and $CaAlSiN_3$:Eu (CASN) were used as a blue light emitting phosphor, a green light emitting phosphor, and a red light emitting phosphor.

$Y_3Ga_5O_{12}$:Cr phosphor was weighed at 8 mg, added to 80 µl of fluororesin, and mixed. Next, the dispersion left for about one day was potted on the quartz glass of the LED module 2. The dispersion was air-dried for about 30 minutes and then baked at 50° C. for about 30 minutes to solidify the fluororesin surface.

SCA, BOS, and CASN were each weighed at 8 mg, added to 240 µl of fluororesin, and mixed. Next, the mixture left for about one day was further potted on the fluororesin in which the $Y_3Ga_5O_{12}$:Cr phosphor was dispersed. The mixture was air-dried for about 30 minutes, then baked at 50° C. for about 30 minutes, and further air-dried for several days to solidify the fluororesin surface, thereby forming a two-layer structure including a layer in which the near-infrared emitting phosphor was dispersed and a layer in which the blue light emitting phosphor, the green light emitting phosphor, and the red light emitting phosphor were dispersed. The light power of the produced light source 1 was improved by adding an LED element emitting 405 nm light to an LED element emitting 340 nm light, and the produced light source was good as a light source for biochemical analysis.

The present invention is not limited to the above-described embodiments and includes various modifications. For example, addition of another configuration, deletion, or replacement of part of the configuration of the embodiment with another configuration are possible.

REFERENCE SIGNS LIST

1: light source
2: LED module
3: transparent resin
4: LED element
5: heatsink
6: wiring
7: phosphor All publications, patents, and patent applications cited herein are hereby incorporated by reference in their entirety.

The invention claimed is:

1. A phosphor comprising:
   gallium oxide $Ga_2O_3$ as a matrix composition, one or two elements selected from Cr and Fe as a luminescent center, and aluminum fluoride $AlF_3$ as a flux.
2. The phosphor according to claim 1, further comprising:
   one or more elements selected from Y and Gd.
3. The phosphor according to claim 1, further comprising:
   one or more elements selected from Ba, Sr, and Ca.
4. The phosphor according to claim 1, wherein
   an average particle size is 1 µm to 70 µm.
5. The phosphor according to claim 1, wherein
   the element as the luminescent center is Cr, and the concentration of Cr is 1.0 mol % to 2.5 mol % with respect to Ga.
6. The phosphor according to claim 1, wherein
   the Al concentration of aluminum fluoride $AF_3$ is 5 mol % to 40 mol % with respect to Ga.
7. A light source comprising:
   a light emitting element and a fluorescent film containing a phosphor that is excited by part of the light emitted from the light emitting element, wherein
   the light emitting element emits near-ultraviolet light to blue light, and
   the phosphor includes the phosphor according to claim 1, and outputs light obtained by mixing near-ultraviolet light to blue light from the light emitting element and near infrared light from the phosphor.

8. The light source according to claim 7, wherein the phosphor further includes one or more phosphors selected from a blue light emitting phosphor, a green light emitting phosphor, and a red light emitting phosphor, which are excited by part of the light from the light emitting element.

9. A biochemical analysis device comprising the light source according to claim 8, a sample cell, and a light receiving device.

10. A method for preparing the phosphor according to claim 1, the method comprising:
   a step of preparing a mixture by mixing gallium oxide $Ga_2O_3$ as a matrix composition, a compound containing one or two elements selected from Cr and Fe as a luminescent center, and aluminum fluoride $AlF_3$ as a flux, and
   a step of preparing a phosphor by baking the mixture at 1150° C. to 1250° C.

* * * * *